(12) United States Patent
Veitch

(10) Patent No.: US 6,793,060 B2
(45) Date of Patent: Sep. 21, 2004

(54) HEAVY UNIT LOAD CONVEYOR WHEEL

(75) Inventor: John Veitch, Orlando, FL (US)

(73) Assignee: L.B. International, Inc., St. Cloud, FL (US)

(*) Notice: Subject to any disclaimer, the term of this patent is extended or adjusted under 35 U.S.C. 154(b) by 0 days.

(21) Appl. No.: 10/407,494

(22) Filed: Apr. 4, 2003

(65) Prior Publication Data

US 2003/0188951 A1 Oct. 9, 2003

Related U.S. Application Data

(60) Provisional application No. 60/370,314, filed on Apr. 5, 2002.

(51) Int. Cl.[7] .............................................. B65G 13/00
(52) U.S. Cl. ..................................... 193/35 R; 193/37
(58) Field of Search ................................. 193/35 R, 37

(56) References Cited

U.S. PATENT DOCUMENTS

| | | | |
|---|---|---|---|
| 842,156 A | * 1/1907 | Matthews et al. | ........ 193/35 R |
| 1,077,540 A | 11/1913 | McCurdy | |
| 1,909,747 A | 5/1933 | Bohn | |
| 2,729,321 A | 1/1956 | Morrison | |
| 3,443,674 A | 5/1969 | Kornylak | |
| 3,621,960 A | 11/1971 | Kornylak | |
| 4,681,203 A | 7/1987 | Kornylak | |
| 4,969,548 A | 11/1990 | Kornylak | |
| 5,035,314 A | 7/1991 | Kornylak | |
| 5,050,718 A | 9/1991 | Orlosky | |
| RE34,924 E | 5/1995 | Highsmith | |
| 5,435,427 A | 7/1995 | Guiher | |
| 5,476,167 A | 12/1995 | Highsmith | |
| 6,435,328 B1 | 8/2002 | Hammond | |

FOREIGN PATENT DOCUMENTS

DE    34 40 955 A1    5/1985

OTHER PUBLICATIONS

Wheels, S Series, 2001.

* cited by examiner

Primary Examiner—Gene O. Crawford
(74) Attorney, Agent, or Firm—Flynn, Thiel, Boutell & Tanis, P.C.

(57) ABSTRACT

A simplified construction for a conveyor wheel wherein the outer shell of the wheel is formed from two identical shell members which can be identical stampings, with these stampings being hardened and then fixed together to define the assembled shell. The stampings when fixed together are disposed in opposed relationship, and the stampings have inner arcuate raceways which directly define an outer raceway for an annular array of bearing balls. The stampings have outer transversely oriented channel parts which, when the raceways are fixed together, have the open channel parts aligned and abutted to define a generally closed tubular cross section which defines the rim of the wheel. The channel parts have outer flanges which effectively abut and define the outer annular tread of the wheel, the latter being substantially cylindrical to provide a smooth and flat cylindrical surface having a substantial contact area for a load. The edges of the tread are rounded to prevent load damage or hang-up.

10 Claims, 4 Drawing Sheets

HEAVY UNIT LOAD CONVEYOR WHEEL

CROSS REFERENCE TO RELATED APPLICATION

This application claims priority under 35 USC §119(e) now abandoned of provisional application Serial No. 60/370,314 filed Apr. 5, 2002, the entire disclosure of which is herein incorporated by reference.

FIELD OF THE INVENTION

This invention relates to an improved conveyor wheel or roller for use in storage racks, roller conveyors and the like, and more particularly to an improved conveyor wheel having a hardened outer body shell which defines an outer annular tread for engagement with a load such as a pallet, and the manufacturing method for the conveyor wheel.

BACKGROUND OF THE INVENTION

Conveyors and storage racks, and in particular those which have a slight slope so as to provide gravity-urged movement of loads such as pallets and the like, typically employ a large number of roller units which support the load and provide for movement thereof along the conveyor. A fragmentary view of a known storage rack or conveyor unit 11 is illustrated in FIG. 1, which unit includes a frame or track 12 on which a series of roller units 13 are supported. The roller unit 13 typically includes a shaft 14 which is supported on the frame and which rollingly supports a conveyor wheel 16 thereon, the latter being disposed so that an upper surface thereof defines a generally tangential plane which provides for supportive engagement with the underside of a load 17, such as a conventional pallet. An example of such arrangement is illustrated by U.S. Pat. No. 6,435,328, although it will be appreciated that numerous other conventional conveyor or storage rack arrangements employing conveyor wheels are well known, and the improved conveyor wheel of this invention is obviously usable therewith.

The conveyor wheel 16 is widely used in many conveyor applications and, as illustrated in FIGS. 2–3, comprises a curled edge conveyor wheel constructed principally of four components for defining the outer load-engaging surface and the outer raceway for the ball bearings. This design evolved many years ago from a design adopted from the roller skate industry with this curled edge conveyor wheel construction, as illustrated by FIGS. 2–3, the four principal components which define the shell include two identical stamped steel outer ball raceway washers 21 and 22 which are typically case hardened after stamping, a soft steel outer body shell 23 which serves as the wheel's outer tread and raceway retainer, and a soft steel retainer washer that completes the outer body and assists in retaining the bearing raceway.

The stamped outer ball raceway washers 21 and 22 are identical, one serving as the left hand and the other serving as the right hand component of the outer raceway for confining a plurality of ball bearings 26, the latter being engaged with an inner bearing race 27 defined on and surrounding a support hub or sleeve 28, the latter constituting the inner bearing race member. The outer shells or parts 23 and 24 are assembled over the bearing raceway washers 21–22 and are thereafter die struck so as to curl the outer edge of outer body shell 23 over the outer edge of retainer washer 24, whereby the soft outer shell 23 thus holds the entire wheel arrangement together.

Considering the above construction in more detail, the outer body shell 23 and retainer washer 24 have respective arcuate annular inner rims 31 and 32 which cooperate to define the outer bearing race for confining the ball bearings 26, and the arcuate inner rims 31–32 respectively join to annular walls 33–34 which project radially outwardly, which walls 33–34 at their radially outward ends flare outwardly away from one another. The radial wall 33 of the outer body shell 23 in turn joins to an annular outer wall 36 which extends transversely throughout the width of the conveyor wheel and hence defines a tread which is of a generally cylindrical configuration for contact with a load. The outer free edge of the outer wall 36 is then suitably stamped by being deformed radially inwardly so that there is defined the curled edge 37 which wraps around the outer annular edge of the retainer washer 24 to hence maintain the overall housing structure in a fully assembled and confined condition.

Because the outer body shell 23 must be stamped and deformed during assembly so as to create the curled flange 37 which retains the housing in an assembled condition, the outer shell 23 and in particular the outer tread 36 thereof must necessarily be of a soft steel in order to permit the die forming thereof during assembly. Furthermore, once the wheel housing is assembled with the bearing balls 26 contained therein, subsequent hardening can not be feasibly carried out since such hardening would damage the already hardened balls 26 and ball raceway washers 21–22.

The conveyor wheel 16 as described above, even though it has been and continues to be used in many conveyor applications, possesses design characteristics that have been observed to contribute to early failure and high cost. For example, it has been observed that a conveyor wheel in accordance with this design does not have a long life cycle when utilized in use applications involving heavy loading, impact loading and/or intrusion by nails protruding from the bottom boards of wooden pallets that are being conveyed over their surface. The soft steel of the outer housing shell 23 has been observed to collapse, causing the outer ball raceways 21–22 to spread apart, thereby allowing the ball bearings to fall out of the assembly and resulting in complete bearing failure as well as failure of the conveyor system.

In situations in which there is a need to provide a conveyor wheel having a hardened outer body shell, attempts have been made to use a conveyor wheel of the type illustrated by FIG. 4. The known conveyor wheel 41 of FIG. 4 is defined principally by two stamped and hardened wheel shells 42 which are normally of identical construction and disposed and secured back-to-back. The wheel shells 42 define inner arcuate rims 43 which define an outer bearing race for the ball bearings 26, and these inner rims 43 join to surrounding and radially outwardly projecting annular walls 44 which, during assembly, substantially abut and are fixedly secured in a conventional manner, such as by rivets 46. The radial walls 44 at their outer edges are appropriately deformed through substantially 90° corners to define transversely projecting outer flanges 47 which, when the two wheel shell members 42 are assembled, project axially in opposite directions so that these flanges 47 hence define the outer load-engaging tread of the conveyor wheel. With this construction, however, the load contact area defined by the outer wheel tread (as defined by the pair of flanges 47) is of reduced contact area due to the annular groove 48 which necessarily occurs due to the manner in which the flanges 47 are formed. This groove 48 hence effects a significant reduction in the load-bearing contact area defined by the wheel. Still further, the flanges 47 normally terminate in free edges 49 which are sharp, particularly at the corners thereof, and it has been observed that these sharp edges 49 can cut into and severely damage the load which is engaged with the conveyor wheels, particularly when the load tends to be displaced transversely relative to the conveyor wheels. Also, these edges can hang-up on the loads and prevent the loads from being sidewardly displaced. Accordingly, while wheels of the type illustrated by FIG. 4 have been utilized in an attempt to provide a hardened annular tread, they nevertheless have not proven totally satisfactory in all applications, particularly those involving side movement or side transfer of the loads.

There thus remains a need in the conveyor industry to provide a conveyor roller/wheel having an outer body shell with an appearance and surface similar to that provided by the traditional roller of FIGS. 2–3, but having a hardened outer body shell which provides a significant annular tread for defining a wide contact area, but which is capable of providing wear and durability, such as when handling impact loads or loads where pallets have protruding nails that impact the conveyor wheels. The present invention thus seeks to satisfy this need and provides a hardened conveyor wheel having a smooth and generally cylindrical annular tread of substantial width and contact area so as to facilitate lateral offloads thereon, while providing substantially increased wear and life, and additionally minimizing damage to the loads. The present invention is believed to provide significant advantages in function, manufacturing costs, and appearance, and the wheel and the process for manufacturing the wheel according to the present invention allows for hardening of the principal wheel parts prior to assembly thereof, while at the same time retaining desired performance and function characteristics.

SUMMARY OF THE INVENTION

According to the present invention, there is provided a simplified construction for a conveyor wheel wherein the outer shell of the wheel is formed from two identical shell members which can be identical stampings, with these stampings being hardened and then riveted together to define the assembled shell. The stampings when riveted together are disposed in opposed relationship, and the stampings have inner arcuate raceways which directly define an outer raceway for the bearing balls. The shell members have outer transversely oriented opening channel parts which, when the shell members are fixed together, have the open channel parts aligned and abutted to define a generally closed tubular cross section which defines the rim of the wheel. The channel parts have outer flanges which effectively abut and define the outer annular tread of the wheel, the latter being substantially cylindrical to provide a smooth and flat cylindrical surface having a substantial contact area with a load, with the edges of the tread being rounded so as to prevent damage to the load or hang-up of the load, thereby allowing the load to be displaced or dragged sidewardly over the wheels. With the improved conveyor wheel of the present invention, the overall design is simplified inasmuch as it uses basically only two identical steel parts to define the shell, which two steel parts are defined by the same stamping, thereby simplifying the amount of tooling required, thereby simplifying overall assembly, and hence minimizing the costs associated with making and maintaining tooling and related production equipment.

Figure 1:
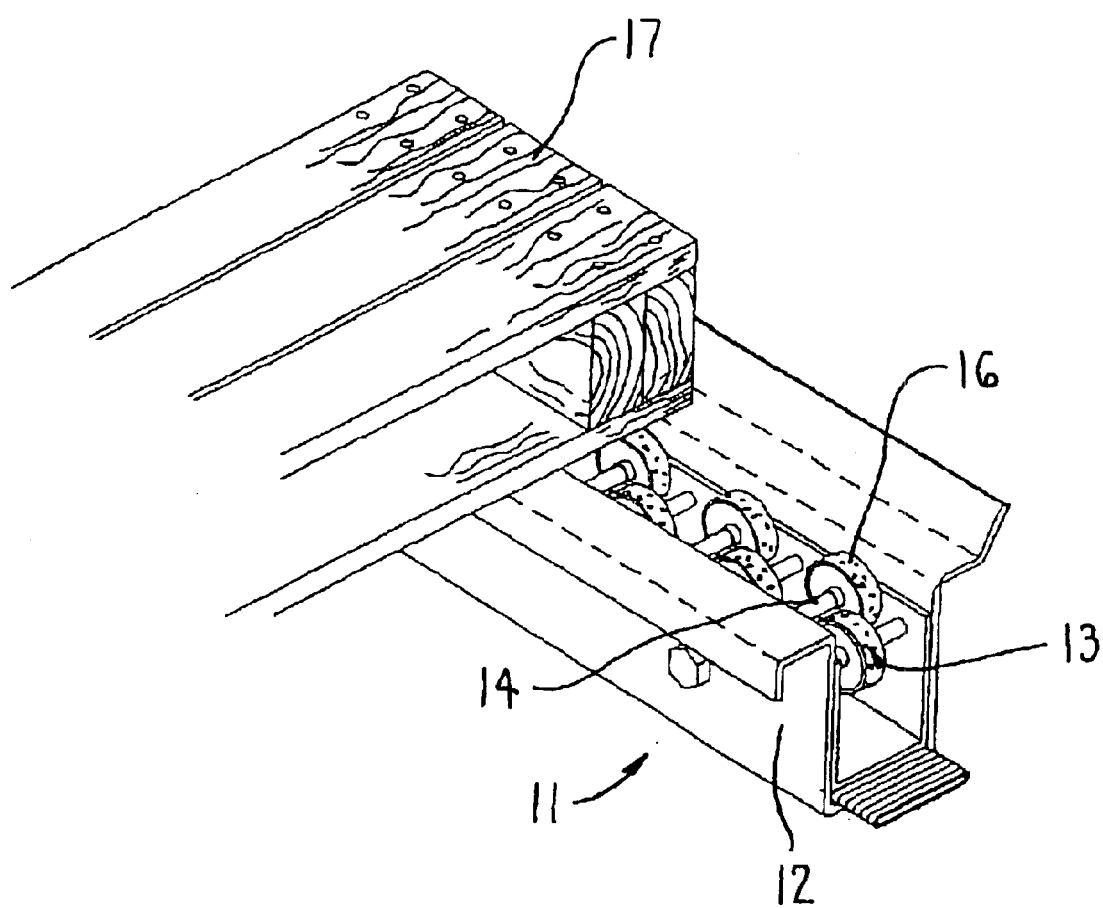
FIG. 1 is a perspective view showing a fragment of a conventional conveyor or support rack.
Figure 2:
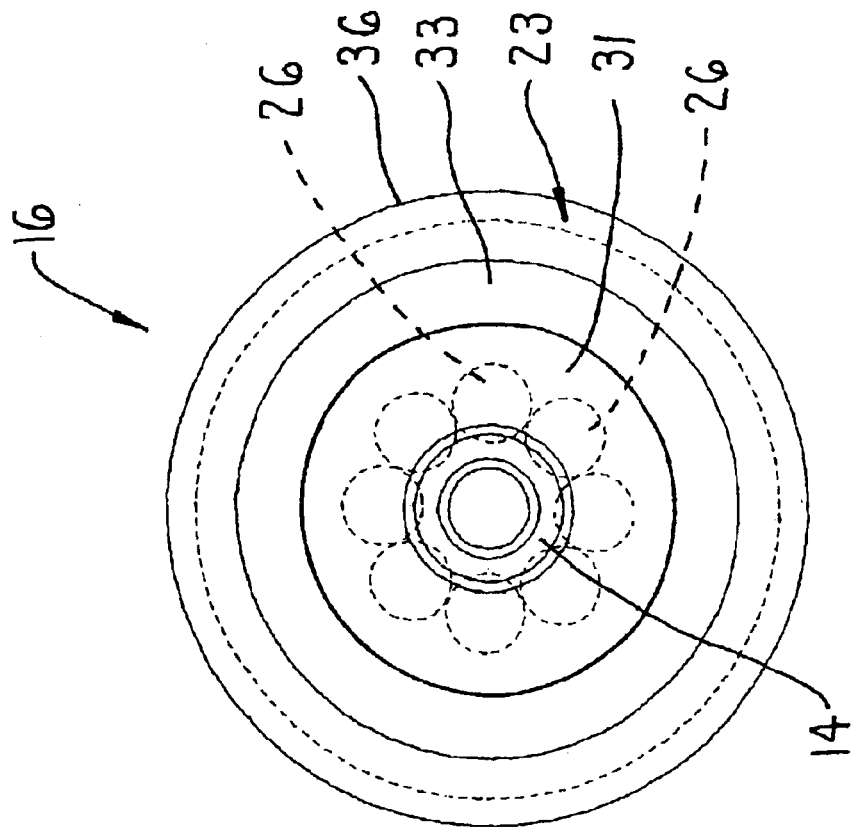
FIG. 2 is a side view of one embodiment of a conventional conveyor wheel.
Figure 3:
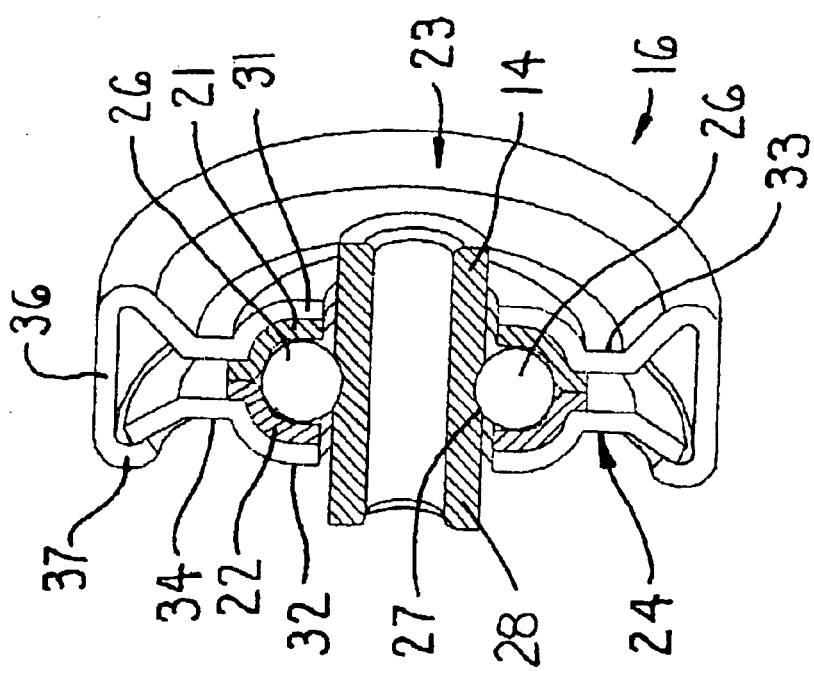
FIG. 3 is a perspective view, showing a transverse central cross section, of the conventional conveyor wheel shown in FIG. 2.
Figure 4:
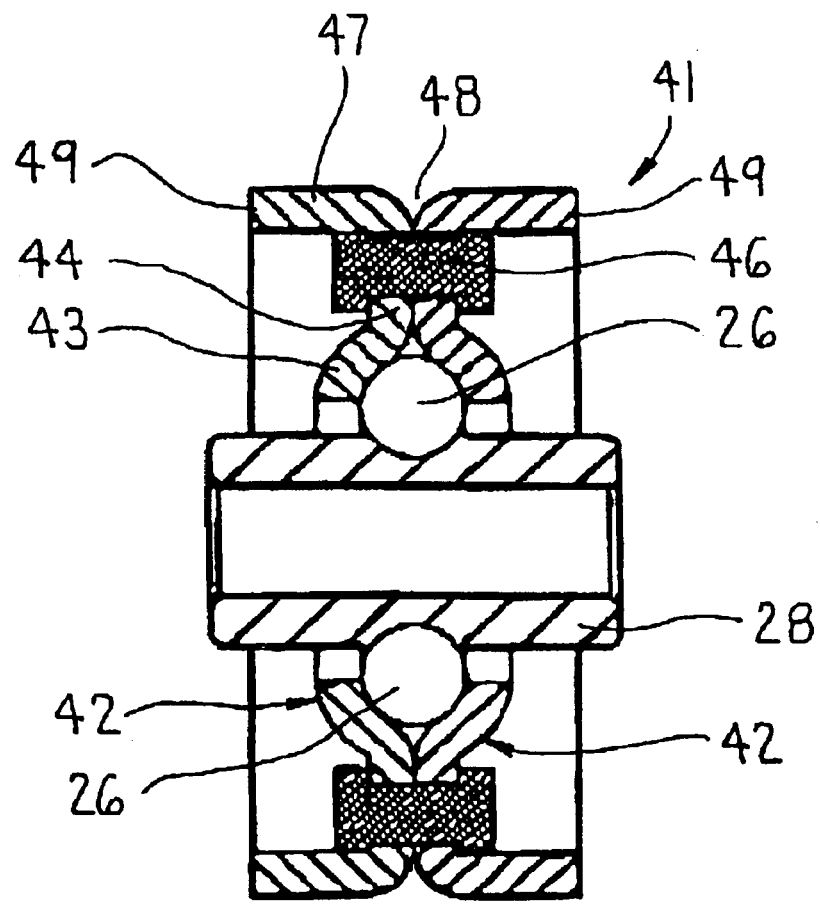
FIG. 4 is a central cross-sectional view of a second variation of a conventional conveyor wheel.

Certain terminology will be used in the following descriptions for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the wheel and of designated parts thereof. Said terminology will include the words specifically mentioned, derivatives thereof, and words of similar import.

DETAILED DESCRIPTION

Figure 5:
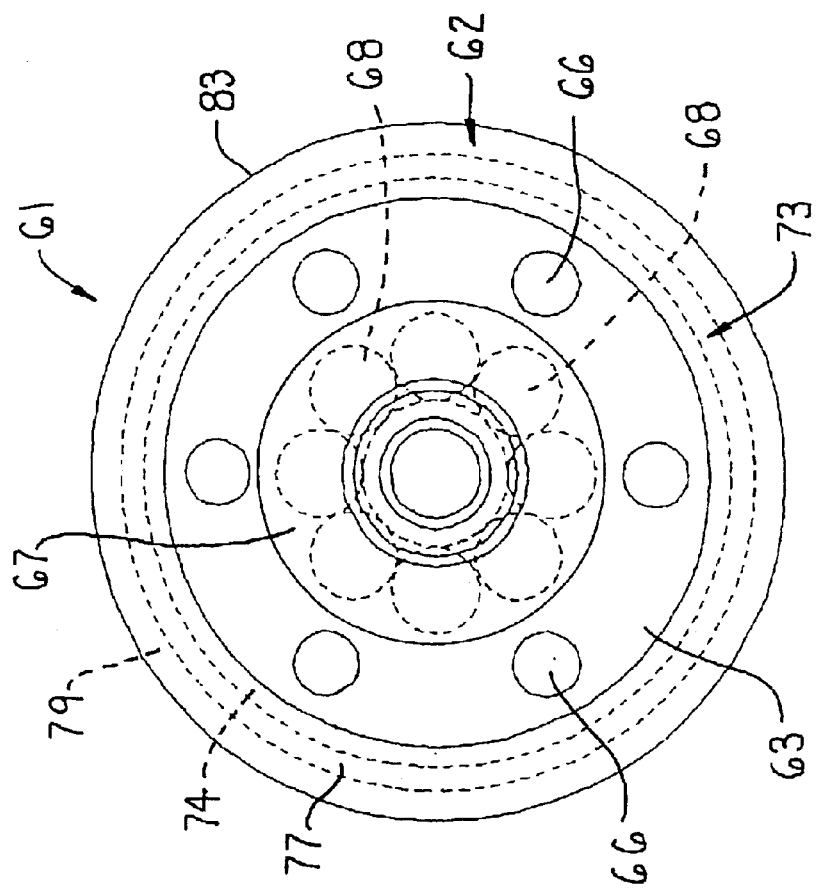
FIG. 5 is a side view of the improved conveyor wheel according to the present invention.
Figure 6:
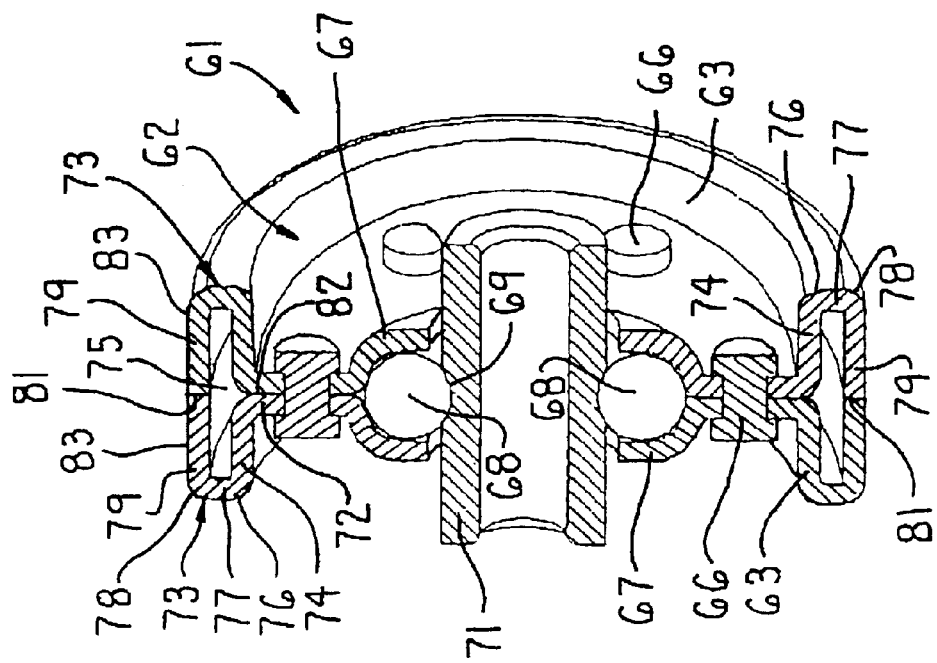
FIG. 6 is a perspective view, showing a central transverse cross section, of the improved conveyor wheel of FIG. 5.

Referring to FIGS. 5–6, there is illustrated a preferred embodiment of a conveyor wheel/roller 61 intended for use in a conveyor or storage rack, such as the arrangement illustrated in FIG. 1. The conveyor wheel 61 of the present invention has the housing 62 thereof defined by two cupped annular disks or shells 63 which can be initially deformed from steel sheet or plate, preferably by stamping, with the shells 63 thereafter being appropriately treated in a conventional manner to effect hardening thereof, such as case hardening. The pair of shells 63 are then positioned in opposed (i.e. face-to-face) relationship as illustrated in FIG. 6, and are then suitably fixedly secured together. In the preferred embodiment the shells 63 are fixedly secured together by a plurality of rivets 66 which are inserted through aligned preformed openings which are formed in the shells in a circular pattern around the web thereof.

As illustrated by FIG. 6, each shell 63 has an arcuate annular inner rim 67 which, when the shells 63 are positioned in opposed relationship, causes the inner rims 67 to effectively define a radially inwardly opening outer bearing race for confining a plurality of bearing balls 68. The balls 68 in turn cooperate with an inner race groove 69 associated with the outer surface of a spindle or sleeve 71, the latter functioning as an inner race member for the bearing.

The shell 63 has a generally flat annular web wall 72 which surrounds and projects radially outwardly from the inner rim 67, which rib wall has a series of angularly spaced openings formed therethrough for accommodating the rivets 66 as described above. The radially projecting rib wall 72 at its radially outer edge is joined to a generally U-shaped annular channel part 73 which projects axially away from the respective web wall 72 in the same axial direction as the respective inner rim 67. The U-shaped channel part 73 defines therein an opening 75 which opens in the opposite axial direction.

The U-shaped channel part 73 includes an inner annular flange or wall 74 which projects transversely (i.e., axially) away from the outer edge of the web wall 67 through a selected extent. This inner annular wall 74 at its axially outer end is joined through a rounded corner 76 to an annular rim wall 77 which projects radially outwardly through a small extent. This annular rim wall 77 is joined at its radially outer edge through a rounded corner 78 to an outer annular flange or wall 79, which wall 79 projects axially inwardly from the rim wall 77 and terminates at an annular free edge 81, the latter being disposed substantially at a center transverse plane as defined by the inner side surface 82 of the web wall 72. The outer annular flange 79 defines thereon a surrounding annular outer surface 83 which is generally cylindrical and of substantially uniform radius generated about the spindle axis as this surface 83 extends axially between the free edge 81 and the outer rounded corner 78.

When the pair of housing shells 63 are assembled in facing relationship and rigidly joined together by the rivets 66, the channel parts 73 of the two shells are disposed so as to directly oppose and engage one another as illustrated in FIG. 6, whereby the free edges 81 of the channel parts are maintained in abutting engagement with one another, and the annular outer surfaces 83 of the outer flanges define a relatively wide cylindrical outer surface of substantially uniform diameter which hence functions as the tread contact area for engagement with a load such as a pallet. The tread surface defined by the outer surfaces 83 of the abutting flanges 79 thus functions as an axially wide and continuous cylindrical surface which is effectively free of grooves or other interruptions, and which at opposite axial edges thereof is defined by smoothly rounded corners so that the wheel readily permits transverse or sideward displacement of loads without causing hang-up of the load or damage to the load. At the same time, the tread surface defined by the pair of abutting outer flanges 79 is of a hardened steel material and is much more capable of sustaining impact loads or protruding nails associated with pallets so as to provide significantly increased wear resistance and hence significantly increased wheel life.

At the same time the housing 61 for confining the bearing balls 68 and for defining the contact surface 83, 83 for the load is defined entirely by two identically shaped disk members 63 which can be suitably stamped and hardened prior to assembly, which two stamped and hardened disk members 63 are effectively not only for confining a single row of bearing balls but also define the outer load-engaging tread of the roller.

The housing assembly and specifically the cooperation of the opposed U-shaped parts 73, when the pair of shells 63 are fixedly assembled in face-to-face relationship, results in the wheel having an overall exterior tread arrangement defined generally by a closed but hollow rectangular wall structure which is defined by the opposed but cooperating pair of channel parts 73. This structure, in addition to the hardness and wear properties associated therewith, also possesses substantial strength and rigidity since, even though the top flanges 79 are cantilevered, nevertheless the cantilevered free edges 81 are disposed generally along the center transverse plane of the wheel, rather than at the side edges, and hence at such location are less subject to being deformed since any loads imposed on the tread in the vicinity of the abutting free edges 81 will be distributed at least partially over each of the flanges 79 so as to minimize the possibility of the flanges being distorted or deflected.

In a typical conveyor wheel according to the present invention, the shells 63 are preferably provided with a hardness of at least about $R_c50$. And the wheel will utilize a plurality of hardened bearing balls of conventional number and size, and the opposed race surface defined on the shaft 71 is typically hardened, and the ball bearing contact surfaces are also coated, such as by being zinc plated, to provide a long wearing and minimal friction characteristic.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A roller track for a storage rack or roller conveyor, comprising a wall arrangement, and a longitudinally-extending array of freely rotatable roller units supported on the wall for supportive engagement with a load, the roller units being disposed for rotation about generally parallel horizontal axes which are horizontally spaced along a longitudinally-extending conveying direction, each roller unit including an annular roller housing rolling rotatably supported through an annular array of antifriction bearing elements on a support spindle for rotation about the respective horizontal axis, the improvement wherein said roller housing comprises two identical annular shaped platelike members which are shaped so that each includes inner and outer annular rim parts rigidly and integrally joined by an intermediate annular web which extends generally radially between the inner and outer rim parts, the inner rim part being defined with an arcuate configuration deformed axially in one direction away from the web so as to define one-half of a raceway for supportedly confining and engaging the plurality of bearing elements, the outer rim part being defined by a generally U-shaped channel structure which includes an inner annular wall which projects axially away from a radially outer edge of said web in the same axial direction as said inner rim part, said inner annular wall at an axially outer end being joined to an annular rim wall which projects radially outwardly and which joins through a rounded corner to an outer annular wall which projects axially in a direction toward the web and which terminates in a free end disposed substantially at a transverse plane which defines one side of the respective platelike member, said members being disposed in opposed face-to-face contacting relationship so that the free ends of the outer walls directly abuttingly engage, said pair of members being fixedly secured together in said opposed face-to-face relationship whereby the inner rim parts cooperate to define a radially inwardly opening annular raceway for direct confinement and engagement with the plurality of rolling bearing elements, and said abutting outer walls defining thereon an outer annular tread surface which is of generally cylindrical configuration and of generally uniform diameter as the tread surface extends axially between the rounded corners defined adjacent opposite edges thereof, the abutting free ends of the outer annular flanges defining a contact plane disposed axially midway between the side edges of the annular tread.

2. A rollway according to claim 1, wherein the opposed members are rigidly joined together by a plurality of rivets which extend between the webs of the engaged members.

3. A roller track according to claim 1, wherein said webs are disposed substantially in abutting engagement when said shaped members are rigidly fixed together in opposed facing relationship, and wherein said outer rim parts have the opposed channel-like shapes thereof axially abutted to define an annular tread structure which surrounds the roller housing and is of a generally tubular cross section.

4. A roller track according to claim 1, wherein said roller housing is defined in its entirety by said pair of identical shaped members which are disposed in opposed face-to-face engaged relationship and are rigidly joined together.

5. A roller track according to claim 4, wherein said members have a hardness of at least about $R_c50$.

6. A roller-type conveying arrangement including a frame, and a generally horizontally elongated rollerway provided on the frame for supporting loads thereon, the rollerway including a plurality of roller units each having a conveyor wheel supported for rotation about a generally horizontal axis which extends transverse to the longitudinal direction of the rollerway, the roller units being disposed in spaced relationship longitudinally along the rollerway so that the axes thereof are disposed in generally parallel but horizontally spaced relationship, the improvement wherein said conveyor wheel comprises a spindle supported generally concentric with the respective axis, a single annular array of rolling bearing balls disposed in rolling and surrounding engagement with the spindle, and a wheel housing disposed in surrounding and confining relationship with the annular array of bearing balls so that the wheel housing is freely rotatable about said axis, said wheel housing being defined by two identical stamped annular disks which are of hardened steel, said two disks being disposed in axially opposed and abutting engagement and being axially rigidly fixed together, said disks having radially inner annular rim parts which are arcuately shaped in cross section and cooperate to define a radially inwardly opening outer bearing race for directly confining and rollingly engaging the annular array of bearing balls, said disks having outer rim parts which are of axially-opening channel-like cross sections which are disposed in directly opposed and abutting engagement to define an annular tread which surrounds the wheel housing and is of a generally closed but hollow tubular cross section, said tread having a radially outer annular wall which is defined by opposed and axially abutting annular outer flanges associated with the respective outer rim parts, the annular tread defining thereon an axially-elongated outer cylindrical surface which is of substantially uniform diameter throughout the length thereof as generated about said axis, and said annular tread adjacent opposite axial sides thereof being joined to rounded corners which bend radially inwardly toward said axis.

7. An arrangement according to claim 6, wherein the rounded outer corners of said annular tread surface join to rim walls which project radially inwardly and which in turn join through intermediate walls to the respective inner rim parts.

8. An arrangement according to claim 6, wherein said disks have a hardness of at least about 50 $R_c$.

9. An arrangement according to claim 6, wherein said pair of opposed disks are rigidly and fixedly joined together by a plurality of rivets which are positioned radially between said inner and outer rim parts and which are disposed in a circular array about said axis.

10. An arrangement according to claim 6, wherein the free edges of said outer flanges abut substantially at a transverse plane which is disposed substantially axially midway of the annular tread.

\* \* \* \* \*